United States Patent
Liu et al.

(10) Patent No.: US 7,928,695 B2
(45) Date of Patent: Apr. 19, 2011

(54) RECHARGEABLE BATTERY PROTECTION DEVICE

(75) Inventors: Jui-Chien Liu, Taipei (TW); Po-Yin Chao, Taipei (TW)

(73) Assignee: Hycon Technology Corp., Taipei County (TW)

( * ) Notice: Subject to any disclaimer, the term of this patent is extended or adjusted under 35 U.S.C. 154(b) by 616 days.

(21) Appl. No.: 12/081,326

(22) Filed: Apr. 15, 2008

(65) Prior Publication Data

US 2009/0257161 A1 Oct. 15, 2009

(51) Int. Cl.
*H01M 10/46* (2006.01)

(52) U.S. Cl. .................................................. 320/134

(58) Field of Classification Search .................. 320/107, 320/114, 134, 136
See application file for complete search history.

(56) References Cited

U.S. PATENT DOCUMENTS

| | | | | |
|---|---|---|---|---|
| 5,896,025 A * | 4/1999 | Yamaguchi et al. | .......... | 320/134 |
| 2006/0109729 A1* | 5/2006 | Yaoi et al. | ..................... | 365/226 |

* cited by examiner

*Primary Examiner* — Edward Tso
(74) *Attorney, Agent, or Firm* — Bacon & Thomas, PLLC (57) ABSTRACT

A rechargeable battery protection device has a voltage detector, a logic circuit, an output stage, a first switch, a second switch and inverter circuits. The device turns on a charger to charge a rechargeable battery or turns off the charger not to charge the rechargeable battery depending on the purpose for battery protection.

12 Claims, 7 Drawing Sheets

RECHARGEABLE BATTERY PROTECTION DEVICE

FIELD OF THE INVENTION

The present invention relates generally to a rechargeable battery protection device. More specifically, the present invention relates to a device which turns on a circuit for a charger to charge a rechargeable battery or turns off the circuit for the charger not to charge the rechargeable battery depending on the purpose for battery protection.

BACKGROUND OF THE INVENTION

Rechargeable batteries are wildly used in electronic products, such as laptops, mobile phones, MP3 players, personal digital assistants (PDAs), etc. In practice, for different design purposes of products, rechargeable batteries can be either detachable or non-detachable types. Many of these products have the rechargeable batteries be charged when the power is running out. However, under this situation, other designers would consider life time of a non-detachable battery and let it be protected from being charged.

Figure 1:
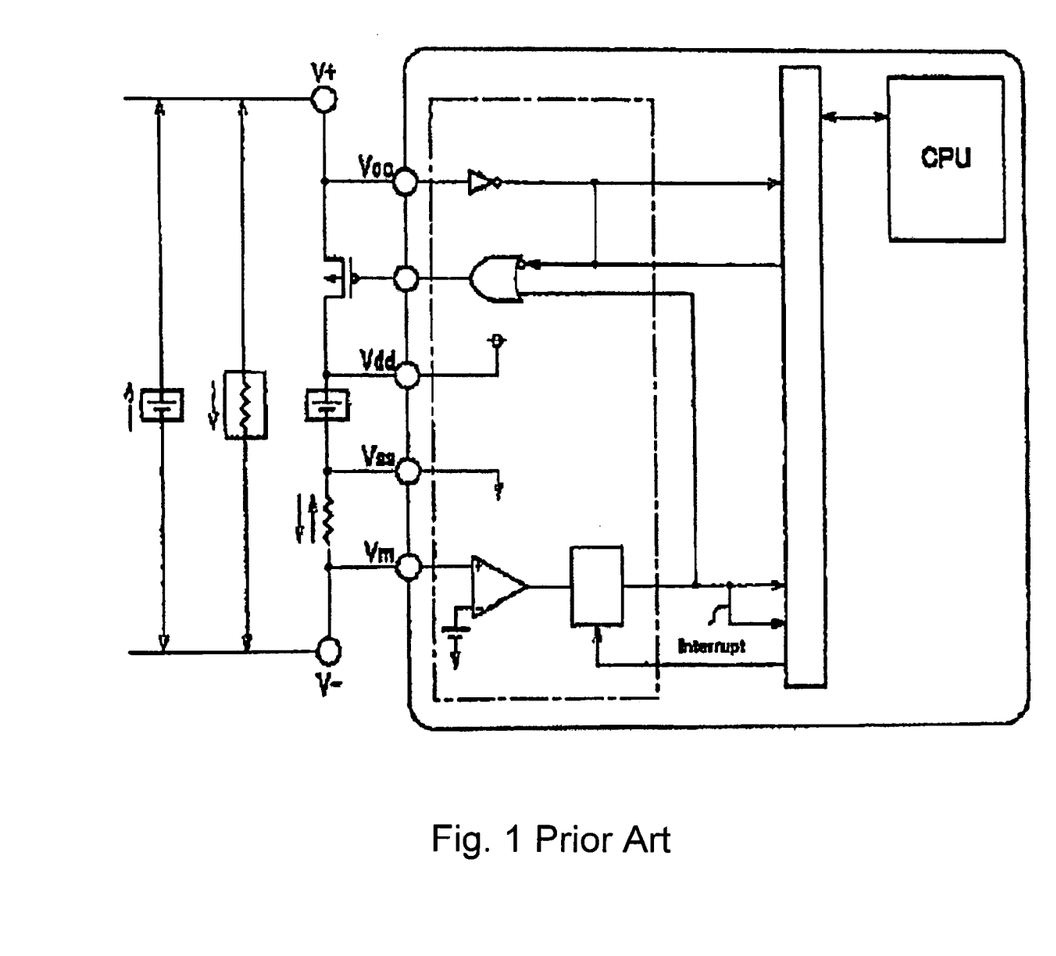
FIG. 1 illustrates a conventional rechargeable battery protection device.

U.S. Pat. No. 7,068,484 reveals a device for rechargeable battery protection (shown in FIG. 1). The device detects a voltage and a current of a power supply circuit and has a protection circuit in a microcomputer. Software is used to determine whether the power supply circuit is on or off so that the rechargeable battery is protected. Although the circuit is miniaturized to a microcomputer, it still needs the help of software. Besides, '484 is not able to switch on/off the power supply circuit when the rechargeable battery has no power but a charger is ready to charge.

This invention provides a suitable solution to the problems mentioned above.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a rechargeable battery protection device comprises a voltage detector for detecting voltages of a first terminal and a second terminal of a rechargeable battery, a logic circuit linked to the voltage detector for outputting a first voltage equal to the voltage of the first terminal of the rechargeable battery and a second voltage equal to the voltage of the second terminal of the rechargeable battery, an output stage coupled to the first and the second terminals of the rechargeable battery for receiving the first voltage from the logic circuit and converting the first voltage into a third voltage, a first switch linked to the second terminal of the rechargeable battery and the logic circuit for receiving the second voltage from the logic circuit for switching on a current path from a first terminal of a charger to a second terminal of the charger when a voltage difference between the first terminal of the rechargeable battery and the second terminal of the rechargeable battery is close to 0V, a second switch linked to the second terminal of the charger and connected in series with the first switch for switching on the current path from the first terminal of the charger to the second terminal of the charger when the voltage difference between the first terminal of the rechargeable battery and the second terminal of the rechargeable battery is close to 0V, and at least two inverter circuits linked to the output stage, the second switch and the first terminal of the rechargeable battery for receiving the third voltage from the output stage and outputting a fourth voltage to the second switch and a fifth voltage to the charger.

Preferably, the first switch comprises a Field Effect Transistor (FET) and a body diode parallelly connected.

Preferably, the second switch comprises a Field Effect Transistor (FET) and a body diode parallelly connected.

Preferably, the FET is a Metal Oxide Semiconductor Field Effect Transistor (MOSFET).

Preferably, the inverter circuits have an even number.

In accordance with another aspect of the present invention, a rechargeable battery protection device comprises a voltage detector for detecting voltages of a first terminal and a second terminal of a rechargeable battery, a logic circuit linked to the voltage detector for outputting a first voltage equal to the voltage of the first terminal of the rechargeable battery and a second voltage equal to the voltage of the second terminal of the rechargeable battery, an output stage coupled to the first and the second terminals of the rechargeable battery for receiving the first voltage from the logic circuit and converting the first voltage into a third voltage, a first switch linked to the second terminal of the rechargeable battery and the logic circuit for receiving the second voltage from the logic circuit for switching off a current path from a first terminal of a charger to a second terminal of the charger when a voltage difference between the first terminal of the rechargeable battery and the second terminal of the rechargeable battery is close to 0V, a second switch linked to the second terminal of the charger and connected in series with the first switch for switching off the current path from the first terminal of the charger to the second terminal of the charger when the voltage difference between the first terminal of the rechargeable battery and the second terminal of the rechargeable battery is close to 0V, and at least one inverter circuit linked to the output stage, the second switch and the first terminal of the rechargeable battery for receiving the third voltage from the output stage and outputting a fourth voltage to the second switch and a fifth voltage to the charger.

Preferably, the first switch comprises a Field Effect Transistor (FET) and a body diode parallelly connected.

Preferably, the second switch comprises a Field Effect Transistor (FET) and a body diode parallelly connected.

Preferably, the FET is a Metal Oxide Semiconductor Field Effect Transistor (MOSFET).

Preferably, the inverter circuit has an odd number.

BRIEF DESCRIPTION OF THE DRAWING

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention will now be described more specifically with reference to the following embodiments. It is to be noted that the following description of preferred embodiments of this invention is presented herein for purpose of illustration and description only. It is not intended to be exhaustive or to be limited to the precise forms disclosed.

Figure 2:
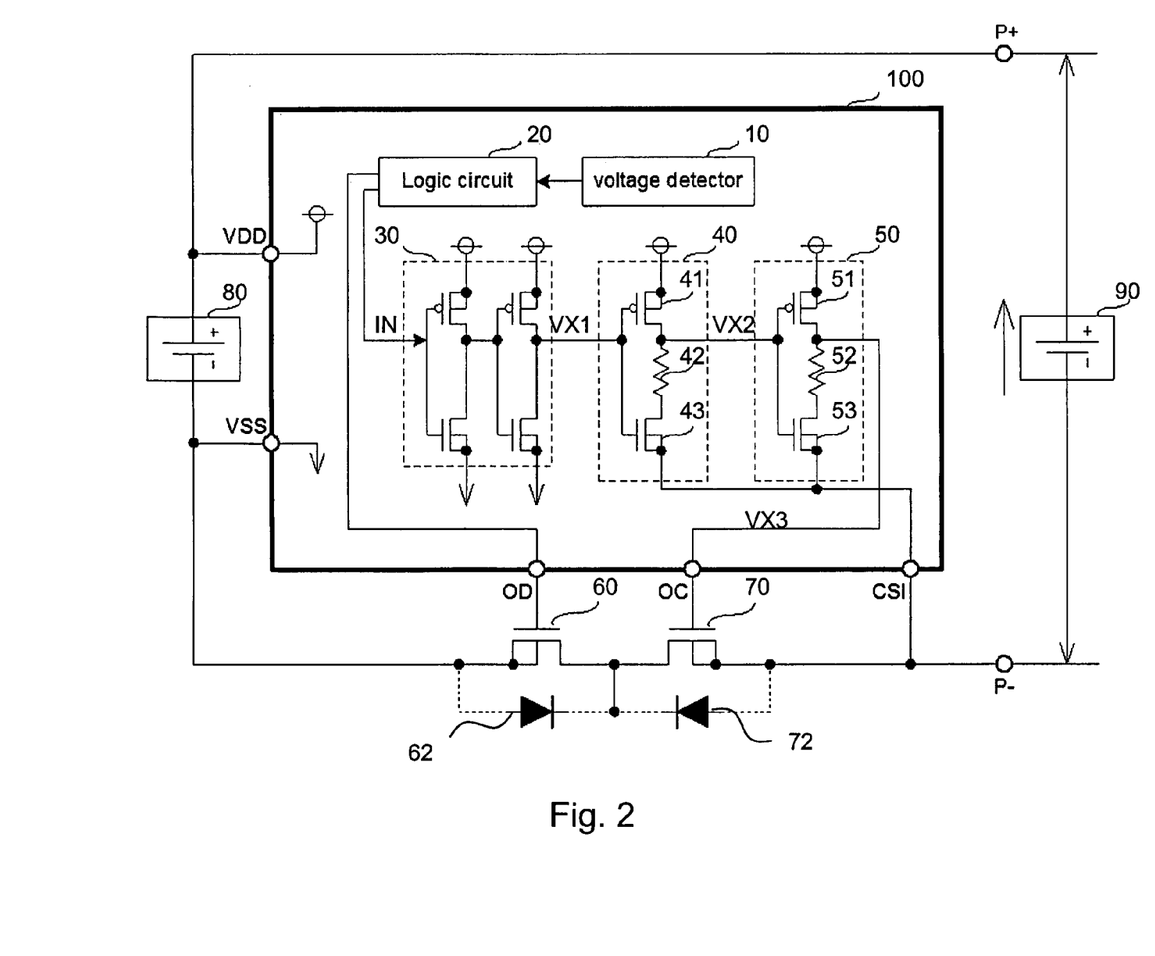
FIG. 2 illustrates a first embodiment of a rechargeable battery protection device.

Please refer to FIG. 2. It shows a first embodiment of a rechargeable battery protection device for the rechargeable battery running out of power. The device comprises a voltage detector 10, a logic circuit 20, an output stage 30, a first inverter 40, a second inverter 50, a first external metal oxide semiconductor field effect transistor (MOSFET) 60, a first body diode 62, a second external MOSFET 70, and a second body diode 72. A rechargeable battery 80 and a charger 90 are coupled in the device. In order to use the device easily in many applications, the voltage detector 10, the logic circuit 20, the output stage 30, the first inverter 40 and the second inverter 50 are integrated into an integrated circuit (IC) 100.

The first inverter 40 connects in series with the output stage 30. The first inverter 40 comprises a first P type MOSFET 41 linking to VDD, a first resistor 42 linking to the first P type MOSFET 41, and a first N type MOSFET 43 linking to the first resistor 42 and a CSI terminal. The first inverter 40 receives a voltage VX1 outputted from the output stage 30 and sends a voltage VX2 to the second inverter 50. The second inverter 50 connects in series with the first inverter 40. The second inverter 50 comprises a second P type MOSFET 51 linking to VDD, a second resistor 52 linking to the second P type MOSFET 51, and a second N type MOSFET 53 linking to the second resistor 52 and an OC terminal. The second inverter 50 receives the voltage VX2 outputted from the first inverter 40 and outputs the voltage VX3 to the OC terminal.

The voltage detector 10 detects voltages at a positive terminal and a negative terminal of the rechargeable battery 80 and feedbacks the information about these voltages to the logic circuit 20. The logic circuit 20 sends a signal IN in the form of voltage to the output stage 30 which is linked to the VDD and VSS. When the voltage difference between the positive terminal and the negative terminal of the rechargeable battery 80 is 0V, the voltage of signal IN should be equal to VDD and is 0V. Thus the voltage VX1 is also equal to VDD and is 0V. When the charger 90 starts to work, the voltage at the CSI terminal is lower than VSS. Under this situation, the first P type MOSFET 41 is turned off and the first N type MOSFET 43 is turned on. Therefore, the voltage VX2 is equal to the voltage of the CSI terminal. The second P type MOSFET 51 is turned on. The second N type MOSFET 53 is turned off. Finally, the voltage of the OC terminal is equal to VDD.

Meanwhile, the voltage at OD terminal is the same as VSS and delivered to the first external MOSFET 60 to turn the first external MOSFET 60 off. The voltage at a negative terminal (point P−) of the charger 90 must be lower than VSS when the charger 90 operates. The CSI terminal has the same potential as the point P−. Thus, the voltage difference between the OC terminal and the CSI terminal keeps greater than the turn-on voltage of the second external MOSFET 70. Now, a current goes from the positive terminal of the charger 90 (Point P+) to the negative terminal of the charger 90 through the positive terminal of the rechargeable battery 80, the negative terminal of the rechargeable battery 80, the body diode 62 of the first external MOSFET 60 and the second external MOSFET 70, thereby completing charging process.

Figure 3:
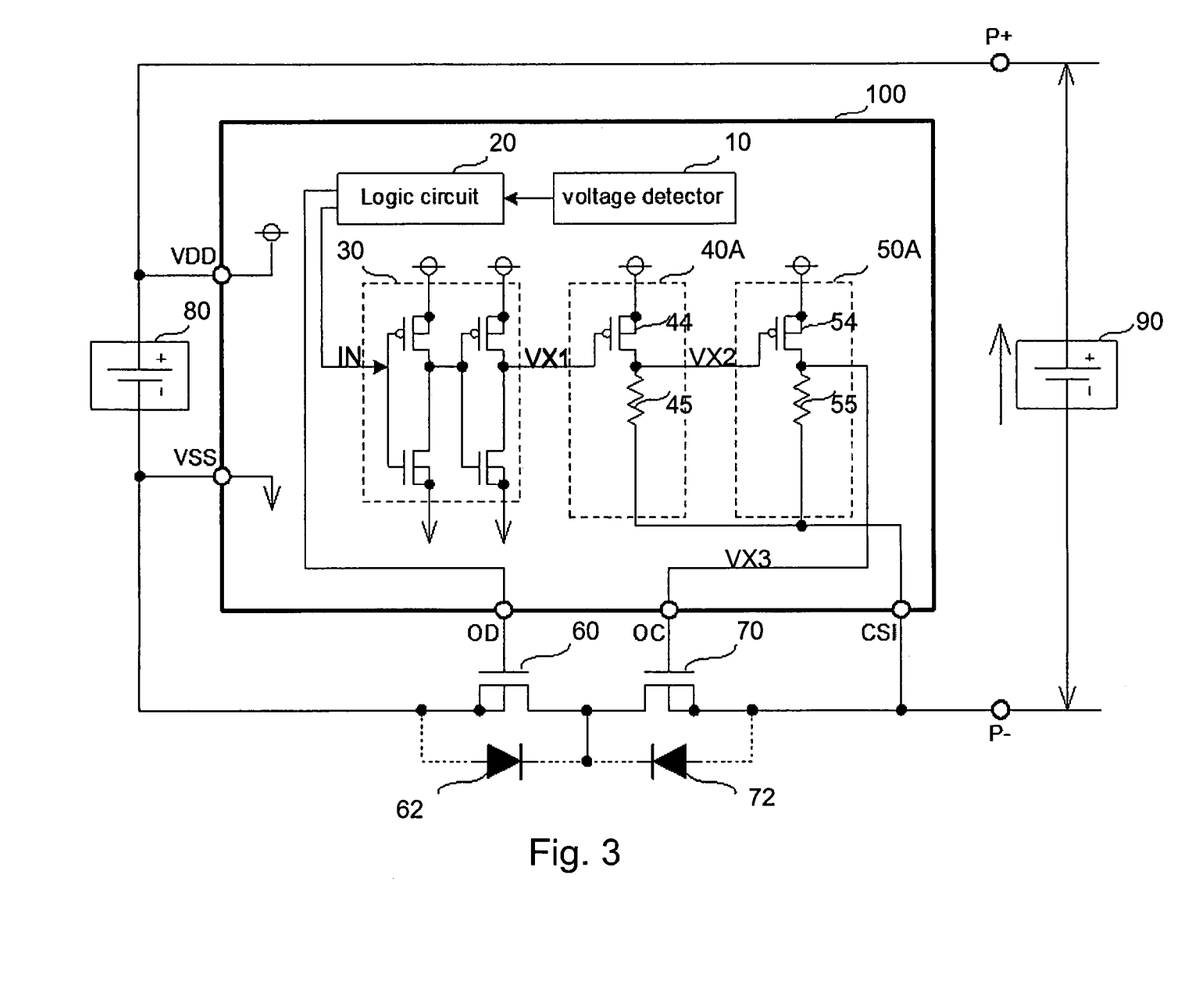
FIG. 3 illustrates a second embodiment of a rechargeable battery protection device.
Figure 4:
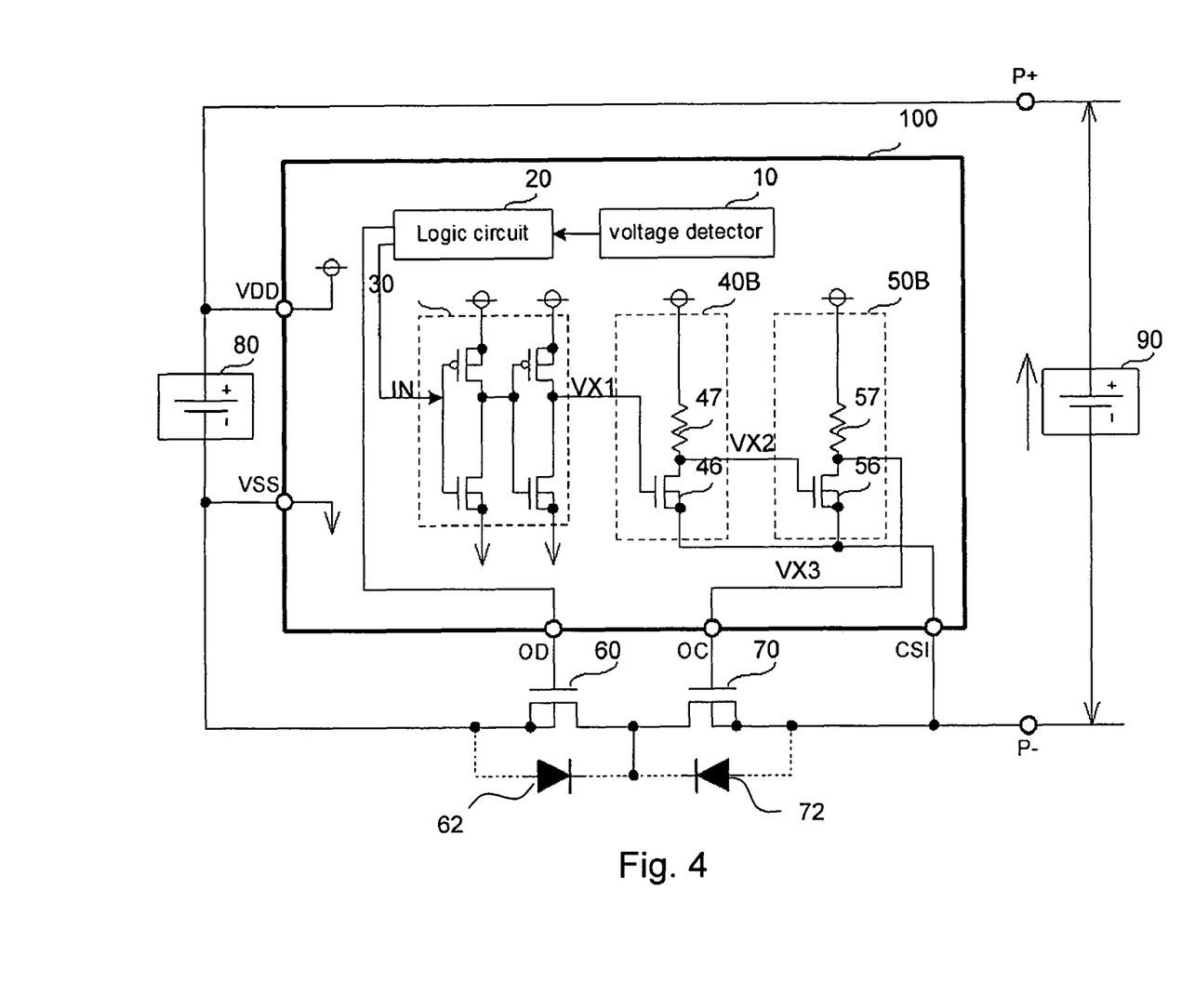
FIG. 4 illustrates a third embodiment of a rechargeable battery protection device.

Key components and layout are described above in detail. Similar designs can have the same effect. FIG. 3 and FIG. 4 show a second and a third embodiments. In the second embodiment, design of inverters is different from that of the first embodiment. A first inverter 40A comprises a third P type MOSFET 44 and a third resistor 45. A second inverter 50A comprises a fourth P type MOSFET 54 and a fourth resistor 55. The rest parts remain the same. The third embodiment has the same situation as the second embodiment. A first inverter 40B comprises a third N type MOSFET 46 and a fifth resistor 47. A second inverter 50B comprises a fourth N type MOSFET 56 and a sixth resistor 57. The rest parts remain the same as shown in the first embodiment.

In accordance with another aspect of the present invention, a rechargeable battery protection device offers automatic charging cut-off when the rechargeable battery runs out of power.

Figure 5:
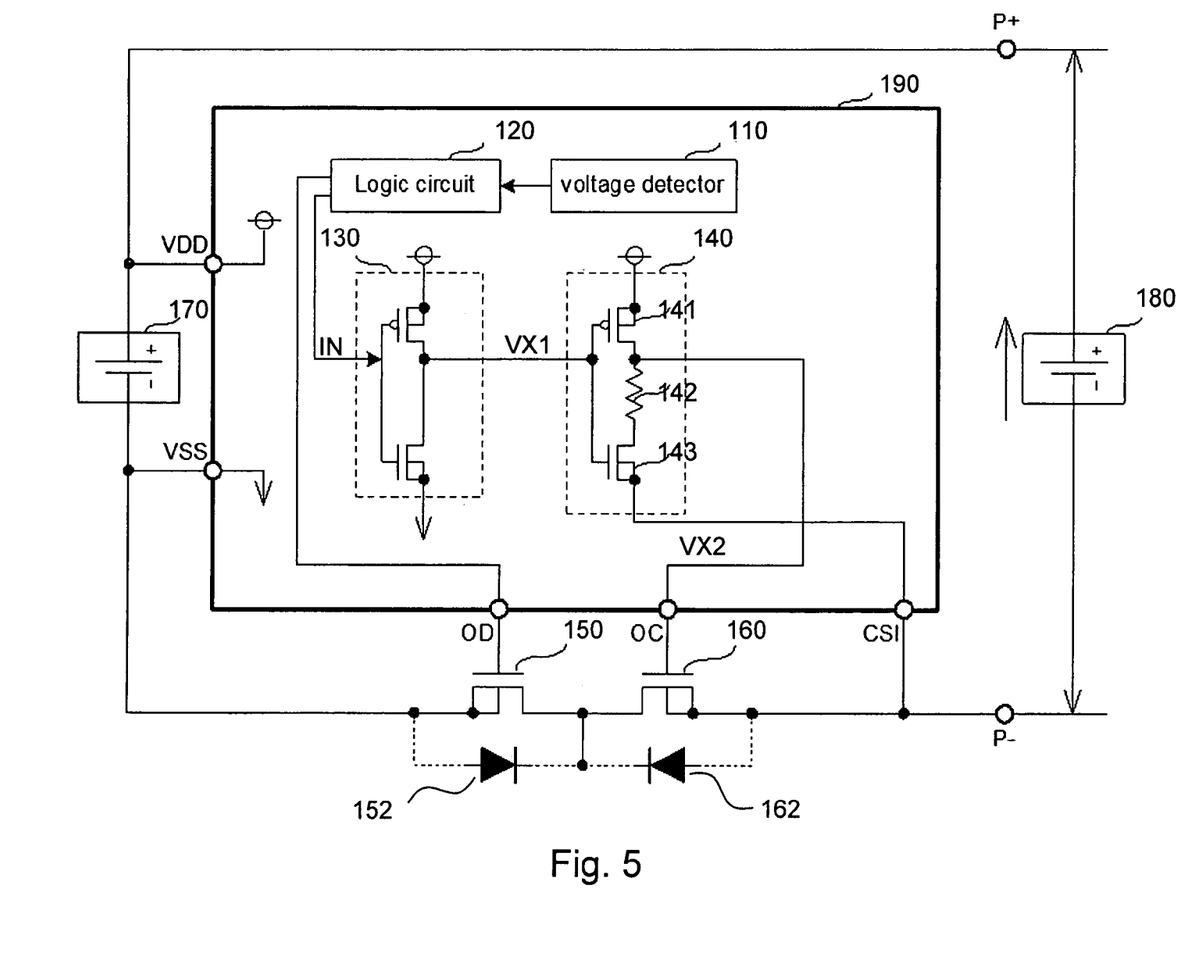
FIG. 5 illustrates a fourth embodiment of a rechargeable battery protection device.

Please refer to FIG. 5. It shows a fourth embodiment of the invention. In the fourth embodiment, a voltage detector 110, a logic circuit 120, an output stage 130, an inverter 140, a first external metal oxide semiconductor field effect transistor (MOSFET) 150, a body diode 152, a second external MOSFET 160 and a second body diode 162 are provided. A charger 180 is coupled to a rechargeable battery 170 to charge the rechargeable battery 170. In order to use the invention easily in many applications, the voltage detector 110, the logic circuit 120, the output stage 130, and the inverter 140 are integrated into an integrated circuit (IC) 190.

The inverter 140 connects in series with the output stage 130. The inverter 140 comprises a first P type MOSFET 141 linking to VDD, a first resistor 142 linking to the first P type MOSFET 141 and a first N type MOSFET 143 linking to the first resistor 142 and a CSI terminal. The inverter 140 receives a voltage VX1 outputted from the output stage 130 and sends a voltage VX2 to an OC terminal.

The voltage detector 110 detects voltages at a positive terminal and a negative terminal of the rechargeable battery 170 and feedbacks the information about these voltages to the logic circuit 120. The logic circuit 120 sends a signal IN in the form of voltage to the output stage 130 which is linked to VDD and VSS. When the voltage difference between the positive terminal and the negative terminal of the rechargeable battery 170 is 0V, the voltage of signal IN should be equal to VDD and is 0V. Thus the voltage VX1 is also equal to VDD and is 0V. When the charger 90 starts to work, the voltage at the CSI terminal is lower than VSS. Under this situation, the first P type MOSFET 141 is turned off and the first N type MOSFET 143 is turned on. Finally, the voltage of the OC terminal is equal to that of the CSI terminal.

Meanwhile, the voltage at OD terminal is the same as VSS and delivered to the first external MOSFET 150 to turn the first external MOSFET 150 off. The voltage at a negative terminal (point P−) must be lower than VSS when the charger 180 operates. The CSI terminal has the same potential as P−. Thus, the voltage difference between the OC terminal and the CSI terminal keeps lower than the turn-on voltage of the second external MOSFET 160. Now, a current can not go from the positive terminal (point P+) of the charger 180 to the negative terminal of the charger 180 since the second external MOSFET 160 is turned off. Charging stops.

Figure 6:
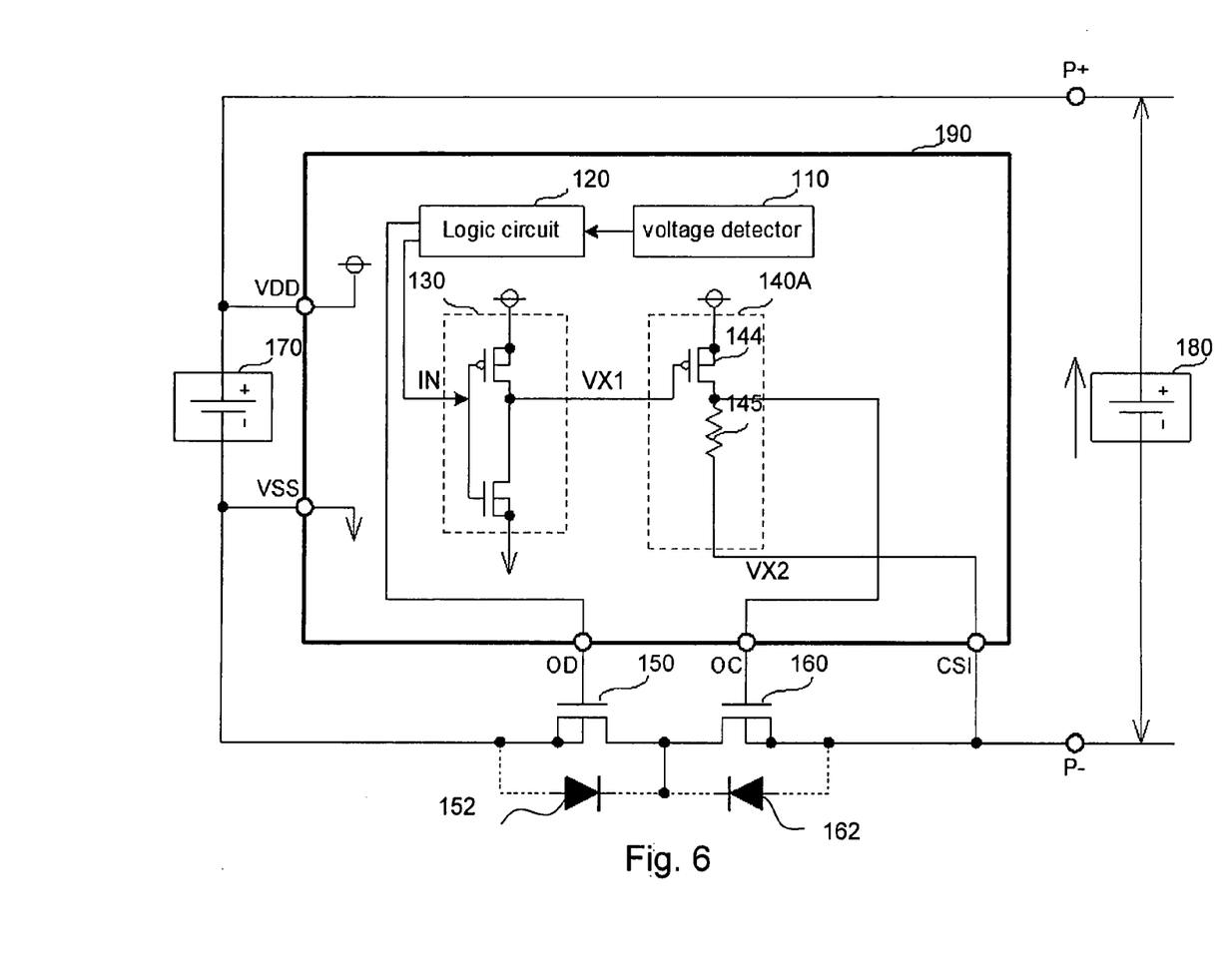
FIG. 6 illustrates a fifth embodiment of a rechargeable battery protection device.
Figure 7:
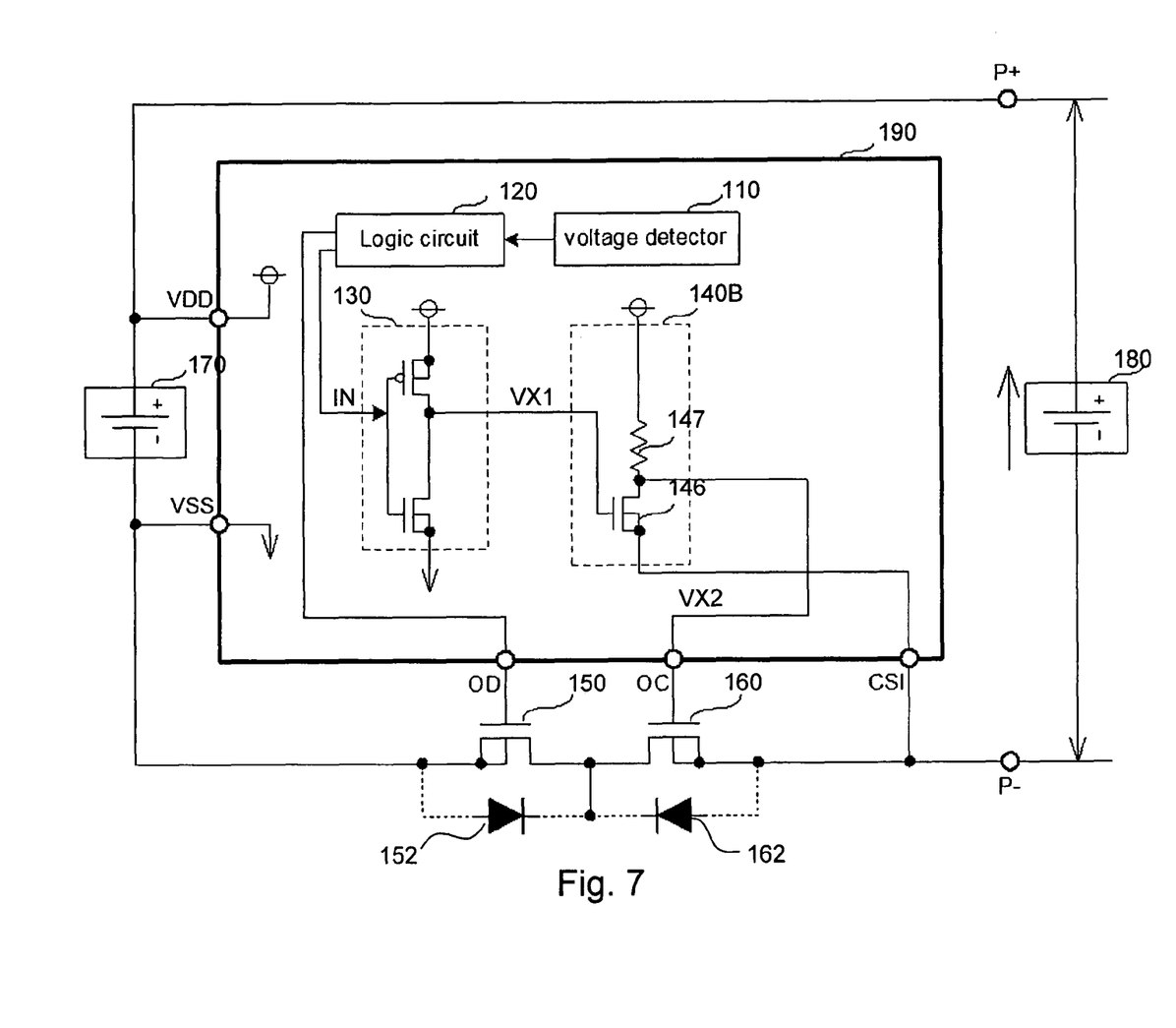
FIG. 7 illustrates a sixth embodiment of a rechargeable battery protection device.

Key components and layout are described above in detail. Similar designs can have the same effect. FIG. 6 and FIG. 7 show a fifth and a sixth embodiments. In the fifth embodiment, design of an inverter 140A is different from that of the fourth embodiment. The inverter 140A comprises a third P type MOSFET 144 and a third resistor 145. The rest parts remain the same. The sixth embodiment has the same situation as the fifth embodiment. The inverter 140B comprises a third N type MOSFET 146 and a fifth resistor 147. The rest parts remain the same.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are accorded with the broadest interpretation so as to encompass all such modifications and similar structures.

What is claimed is:

1. A rechargeable battery protection device, comprising,
    a voltage detector for detecting voltages of a first terminal and a second terminal of a rechargeable battery;
    a logic circuit linked to the voltage detector for outputting a first voltage equal to the voltage of the first terminal of the rechargeable battery and a second voltage equal to the voltage of the second terminal of the rechargeable battery;
    an output stage coupled to the first and the second terminals of the rechargeable battery for receiving the first voltage from the logic circuit and converting the first voltage into a third voltage;
    a first switch linked to the second terminal of the rechargeable battery and the logic circuit for receiving the second voltage from the logic circuit for switching on a current path from a first terminal of a charger to a second terminal of the charger when a voltage difference between the first terminal of the rechargeable battery and the second terminal of the rechargeable battery is close to 0V;
    a second switch linked to the second terminal of the charger and connected in series with the first switch for switching on the current path from the first terminal of the charger to the second terminal of the charger when the voltage difference between the first terminal of the rechargeable battery and the second terminal of the rechargeable battery is close to 0V; and
    at least two inverter circuits linked to the output stage, the second switch and the first terminal of the rechargeable battery for receiving the third voltage from the output stage and outputting a fourth voltage to the second switch and a fifth voltage to the charger.

2. The rechargeable battery protection device according to claim 1, wherein the first switch comprises a Field Effect Transistor (FET) and a body diode parallelly connected.

3. The rechargeable battery protection device according to claim 2, wherein the FET is a Metal Oxide Semiconductor Field Effect Transistor (MOSFET).

4. The rechargeable battery protection device according to claim 1, wherein the second switch comprises a Field Effect Transistor (FET) and a body diode parallelly connected.

5. The rechargeable battery protection device according to claim 4, wherein the FET is a Metal Oxide Semiconductor Field Effect Transistor (MOSFET).

6. The rechargeable battery protection device according to claim 1, wherein the inverter circuits have an even number.

7. A rechargeable battery protection device, comprising,
    a voltage detector for detecting voltages of a first terminal and a second terminal of a rechargeable battery;
    a logic circuit linked to the voltage detector for outputting a first voltage equal to the voltage of the first terminal of the rechargeable battery and a second voltage equal to the voltage of the second terminal of the rechargeable battery;
    an output stage coupled to the first and the second terminals of the rechargeable battery for receiving the first voltage from the logic circuit and converting the first voltage into a third voltage;
    a first switch linked to the second terminal of the rechargeable battery and the logic circuit for receiving the second voltage from the logic circuit for switching off a current path from a first terminal of a charger to a second terminal of the charger when a voltage difference between the first terminal of the rechargeable battery and the second terminal of the rechargeable battery is close to 0V;
    a second switch linked to the second terminal of the charger and connected in series with the first switch for switching off the current path from the first terminal of the charger to the second terminal of the charger when the voltage difference between the first terminal of the rechargeable battery and the second terminal of the rechargeable battery is close to 0V; and
    at least one inverter circuit linked to the output stage, the second switch and the first terminal of the rechargeable battery for receiving the third voltage from the output stage and outputting a fourth voltage to the second switch and a fifth voltage to the charger.

8. The rechargeable battery protection device according to claim 7, wherein the first switch comprises a Field Effect Transistor (FET) and a body diode parallelly connected.

9. The rechargeable battery protection device according to claim 8, wherein the FET is a Metal Oxide Semiconductor Field Effect Transistor (MOSFET).

10. The rechargeable battery protection device according to claim 7, wherein the second switch comprises a Field Effect Transistor (FET) and a body diode parallelly connected.

11. The rechargeable battery protection device according to claim 10, wherein the FET is a Metal Oxide Semiconductor Field Effect Transistor (MOSFET).

12. The rechargeable battery protection device according to claim 7, wherein the inverter circuit has an odd number.

* * * * *